US 9,720,788 B2

(12) United States Patent
Kaneko et al.

(10) Patent No.: US 9,720,788 B2
(45) Date of Patent: Aug. 1, 2017

(54) RECORDING DEVICE AND CONTROL METHOD OF A RECORDING DEVICE

(71) Applicant: Seiko Epson Corporation, Tokyo (JP)

(72) Inventors: Naohiro Kaneko, Shiojiri (JP); Takashi Kawamori, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 74 days.

(21) Appl. No.: 14/826,436

(22) Filed: Aug. 14, 2015

(65) Prior Publication Data

US 2016/0062849 A1 Mar. 3, 2016

(30) Foreign Application Priority Data

Aug. 29, 2014 (JP) ................................ 2014-175270

(51) Int. Cl.
*G06F 11/00* (2006.01)
*G06F 11/14* (2006.01)

(52) U.S. Cl.
CPC ...... *G06F 11/1469* (2013.01); *G06F 11/1435* (2013.01); *G06F 11/1451* (2013.01); *G06F 11/1456* (2013.01); *G06F 2201/84* (2013.01)

(58) Field of Classification Search
CPC ............. G06F 11/1469; G06F 11/1435; G06F 11/1451; G06F 11/1402; G06F 11/1417; G06F 11/1446; G06F 11/1448; G06F 11/1458; G06F 2201/84
USPC ........................................ 714/15, 6.3, 36, 42
See application file for complete search history.

(56) References Cited

U.S. PATENT DOCUMENTS

| 8,028,158 B1* | 9/2011 | Streuter | G06F 8/63 |
| | | | 713/1 |
| 2009/0094447 A1* | 4/2009 | Yang | G06F 9/4406 |
| | | | 713/2 |
| 2009/0172384 A1* | 7/2009 | Anson | G06F 9/44505 |
| | | | 713/2 |
| 2010/0169590 A1* | 7/2010 | Gordon-Carroll | G06F 11/1451 |
| | | | 711/162 |
| 2012/0178422 A1* | 7/2012 | Gayosso Sanchez | H04W 8/183 |
| | | | 455/411 |
| 2012/0239894 A1* | 9/2012 | Chen | G06F 11/1469 |
| | | | 711/162 |

FOREIGN PATENT DOCUMENTS

JP 2003-208357 A 7/2003

* cited by examiner

*Primary Examiner* — Joseph D Manoskey
(74) *Attorney, Agent, or Firm* — Foley & Lardner LLP (57) ABSTRACT

A recording device 11 has a control unit 20 that executes multiple restore processes. The control unit restores a backbone system based on a restore file stored in a USB memory UM if the recording device 11 is started with the USB memory UM already connected. The control unit initializes the backbone system based on an initialization file in the USB memory UM when the USB memory UM is newly connected while the recording device 11 is already running. The control unit creates a restore file to restore the backbone system, and saves the created restore file to the USB memory UM if an initialization file is not already stored in the USB memory UM.

8 Claims, 8 Drawing Sheets

RECORDING DEVICE AND CONTROL METHOD OF A RECORDING DEVICE

BACKGROUND

1. Technical Field

The present invention relates to a recording device and a control method of a recording device.

2. Related Art

Technology that uses an external storage medium (external memory) to backup a system installed on an information processing device is known from the literature. See, for example, JP-A-2003-208357.

When a recording device with the ability to record on recording media uses an external storage medium to restore the system based on a restore file that was backed up, to initialize the system using an initialization file, and to create and store (back up) a restore file, it would be useful for the recording device to use characteristics of the external storage medium to run the processes appropriately.

SUMMARY

A recording device and a control method of a recording device according to the invention enable using a characteristic of an external storage medium to trigger file restoration based on a restore file, to trigger initialization using an initialization file, and to trigger creating and saving a restore file using the external storage medium.

A recording device according to a preferred aspect of the invention has a recording unit that records on recording media; and a control unit that: executes a restore process to restore a backbone system having a basic control system including a control program controlling the recording unit and having basic data used by the basic control system, based on a restore file stored in an external storage medium if the external storage medium is connected to the recording device when the recording device turns on; initializes the backbone system based on an initialization file if the initialization file is stored in the external storage medium when the external storage medium becomes connected to the recording device while the recording device is already running; and creates a restore file to restore the backbone system and save the created restore file to the external storage medium connected to the recording device if an initialization file is not stored on the external storage medium when the external storage medium becomes connected to the recording device while the recording device is running.

Thus comprised, a characteristic of an external storage medium can be used to trigger a recording device to execute a file restoration process based on a restore file stored on the external storage medium, an initialization process using an initialization file, and creating and saving a restore file, using the external storage medium.

Preferably, if the backbone system is modified while the external storage medium is connected and the recording device and the recording device is operating, the control unit stores an updated restore file based on the modified backbone system in the external storage medium.

Note that the process of saving (storing) a restore file includes steps for updating the corresponding restore file stored on the external storage medium, and creating and storing a restore file to the external storage medium. When a change is made to the backbone system, this aspect of the invention stores a restore file to the external storage medium based on the modified backbone system.

In a recording device according to another aspect of the invention, if an existing restore file is stored in the connected external storage medium when the backbone system is modified and the recording device is operating, then the control unit updates the existing restore file in the external storage medium based on the modified backbone system. Furthermore, if a restore file is not stored in the connected external storage medium when the backbone system is modified and the recording device is operating, then the control unit creates the updated restore file based on the modified backbone system and saves updated restore file to the external storage medium.

This aspect of the invention makes the restore file stored on the external storage medium accurately reflect the changes to the backbone system.

In a recording device according to another aspect of the invention, when executing the restore process, the control unit restores the installed basic data based on the restore file, and restores the installed basic control system based on the restore file if the version of the installed basic control system differs from the version of the basic control system in the restore file.

This aspect of the invention shortens the time required for the restore process.

Another aspect of the invention is a control method of a recording device that records on recording media, the control method including: executing a restore process to restore a backbone system having a basic control system including a control program controlling the recording unit and having basic data used by the control system, based on a restore file stored in an external storage medium if an external storage medium is connected to the recording device when the recording device turns on; initializing the backbone system based on an initialization file if the initialization file is stored in the external storage medium when the external storage medium becomes connected to the recording device while the recording device is running; and creating a restore file to restore the backbone system and saving the created restore file to the external storage medium connected to the recording device if an initialization file is not stored on the external storage medium when the external storage medium becomes connected to the recording device while the recording device is running.

Thus comprised, a characteristic of an external storage medium can be used to trigger a recording device to execute a file restoration process based on a restore file stored on the external storage medium, an initialization process using an initialization file, and creating and saving a restore file, using the external storage medium.

Other objects and attainments together with a fuller understanding of the invention will become apparent and appreciated by referring to the following description and claims taken in conjunction with the accompanying drawings.

DESCRIPTION OF EMBODIMENTS

Figure 1:
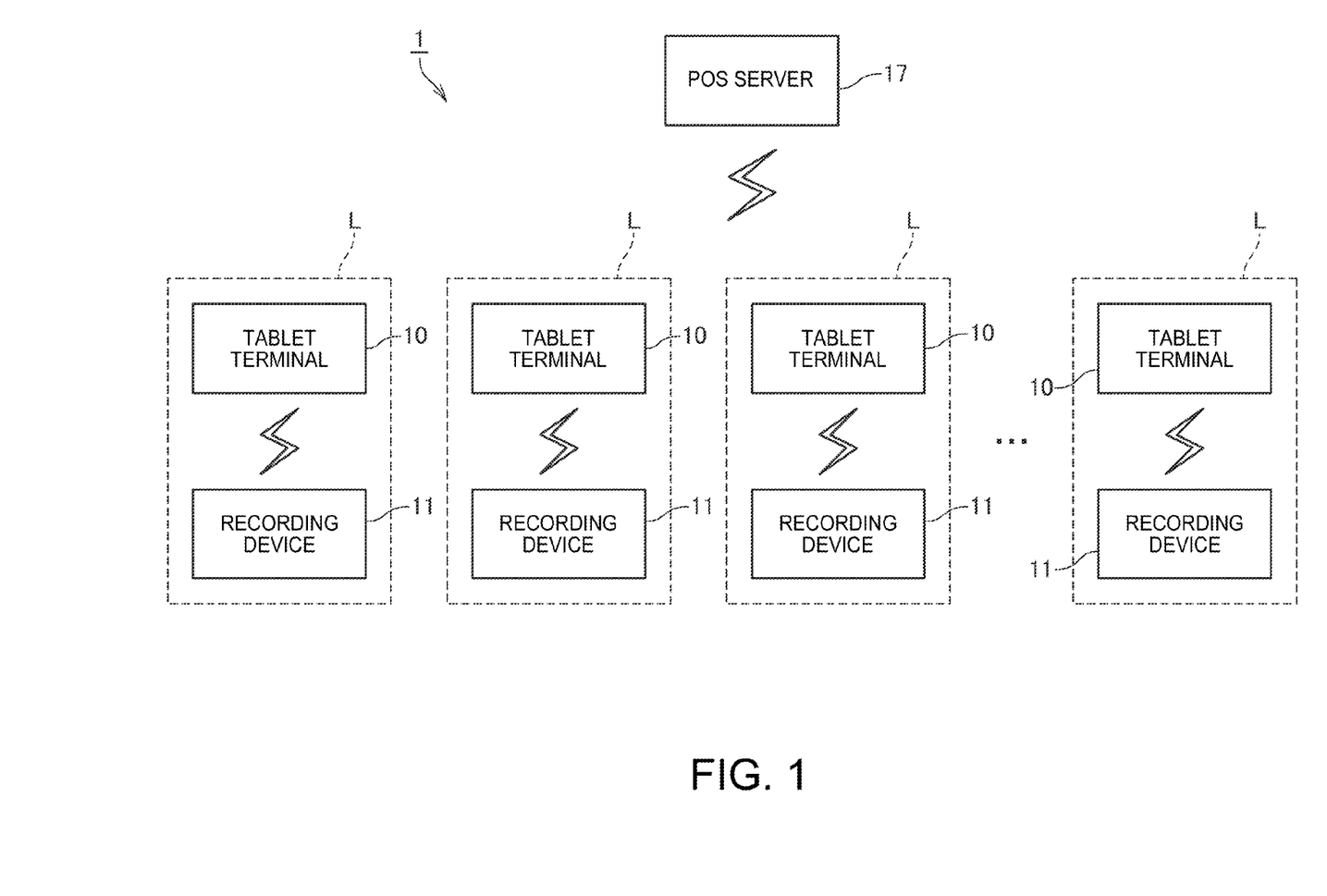
FIG. 1 illustrates the configuration of a POS system according to the invention.

A preferred embodiment of the present invention is described below with reference to the accompanying figures. FIG. 1 illustrates a POS (point-of-sale) system 1 according to a preferred embodiment of the invention.

The POS system 1 is a system that is employed in shopping centers, department stores, convenience stores, and other types of retail stores, restaurants, coffee shops, and other food service providers, and other types of stores and businesses. The POS system 1 has functions for managing product sales, inventory, and sales trends, processing transactions for products purchased by customers at checkout counters L in the business, and producing receipts based on the transactions. There are plural checkout counters L where transactions are processed in a store where the POS system 1 is used. One recording device 11 and one tablet terminal 10 (control device) wirelessly connected to the one recording device 11 are disposed at one checkout counter L.

The tablet terminal 10 is a tablet computer. As described further below, the tablet terminal 10 has a touch panel 28 (see FIG. 3) on the front of the tablet enabling input by touch operations. The tablet terminal 10 is a tablet used by a checkout clerk (operator) that processes transactions at the checkout counter L. As described below, the tablet terminal 10 provides an appropriate user interface to the checkout clerk for processing transactions at the checkout counter L. The checkout clerk inputs transaction information through the user interface, and references information related to the transaction that is displayed through the user interface. The tablet terminal 10 also controls the recording device 11 to print a receipt according to the transaction completed at the checkout counter L. The receipt produced by the recording device 11 is then given to the customer.

Figure 2:
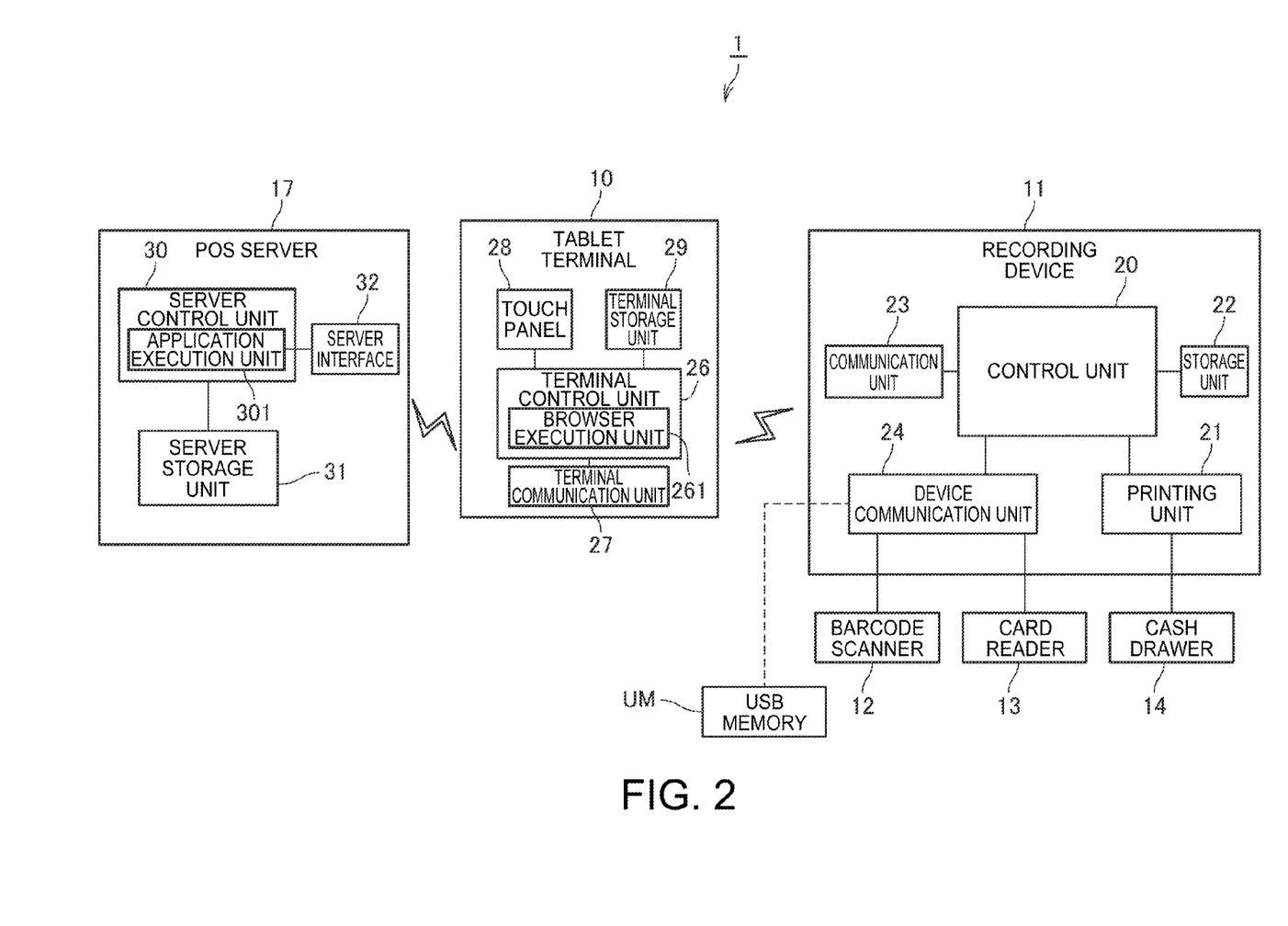
FIG. 2 is a block diagram illustrating the functional configuration of the POS system.

FIG. 2 is a block diagram showing a functional configuration of the tablet terminal 10, recording device 11, and POS server 17 in the POS system 1.

The recording device 11 is a thermal printer that stores roll paper and records images by forming dots on thermal paper. As shown in FIG. 2, the recording device 11 has a control unit 20, a printing unit 21 (recording unit), a storage unit 22, a communication unit 23, and a device communication unit 24.

The control unit 20 includes a CPU, ROM, RAM, and controls the recording device 11.

The printing unit 21 includes various mechanisms for recording on roll paper, including a conveyance mechanism for conveying roll paper (recording media) stored inside the case of the recording device 11, a recording mechanism for recording images by forming dots on the roll paper with a thermal head, and a cutter unit for cutting the roll paper at a specific position. The printing unit 21 produces a receipt by recording images related to the receipt on roll paper with the recording mechanism while conveying the roll paper with the conveyance mechanism, and then cutting the roll paper at a specific position by the cutter unit as controlled by the control unit 20. A cash drawer 14 is connected to the printing unit 21 by a signal bus according to a specific serial communication protocol. The printing unit 21 outputs signals to the cash drawer 14 and causes the cash drawer 14 to open as controlled by the control unit 20.

The storage unit 22 includes EEPROM or other nonvolatile memory and stores data.

The communication unit 23 communicates with the tablet terminal 10 according to a specific communication protocol as controlled by the control unit 20.

The device communication unit 24 has an interface board with a physical port using the USB (Universal Serial Bus) standard, and communicates with the barcode scanner 12 (device) and card reader 13 (device) using the USB protocol. When USB memory UM (external storage medium) is connected, the device communication unit 24 also communicates with the USB memory UM.

The barcode scanner 12 reads barcodes from products or product packaging, and outputs data representing the read result to the device communication unit 24. The device communication unit 24 then outputs the data input from the barcode scanner 12 to the control unit 20.

The card reader 13 reads magnetic information recorded on a magnetic card, and outputs data representing the read result to the device communication unit 24. The device communication unit 24 then outputs the data input from the card reader 13 to the control unit 20.

USB memory UM is a secondary storage device removably connected to the recording device 11, and records data.

As shown in FIG. 2, the tablet terminal 10 has a terminal control unit 26, terminal communication unit 27, touch panel 28, and terminal storage unit 29.

The terminal control unit 26 includes a CPU, ROM, RAM, and other peripheral circuits and controls the tablet terminal 10. A web browser is installed to the tablet terminal 10. The terminal control unit 26 functions as a browser execution unit 261 by reading and running the web browser.

The terminal communication unit 27 communicates with the recording device 11 and POS server 17 according to a specific wireless communication protocol as controlled by the terminal control unit 26.

The touch panel 28 includes an LCD panel or other type of display panel, and a touch sensor disposed over the display panel. The display panel displays images as controlled by the terminal control unit 26. The touch sensor detects and outputs touch operations to the terminal control unit 26.

The terminal storage unit 29 includes EEPROM or other nonvolatile memory and stores data.

As shown in FIG. 2, the POS server 17 has a server control unit 30, a server storage unit 31, and a server interface 32. The server control unit 30 includes a CPU, ROM, RAM, and other peripheral circuits not shown, and controls the POS server 17. A POS application is installed on the POS server 17. The server control unit 30 functions as an application execution unit 301 by reading and running the POS application.

The server storage unit 31 includes a nonvolatile storage device such as a hard disk drive or EEPROM, and stores data. The server storage unit 31 stores a database storing product-related information, a database for managing sales, and a database for managing inventory. The server control unit 30 uses the databases stored in the server storage unit 31 to manage the POS system 1.

The server interface 32 communicates with the tablet terminal 10 according to a specific wireless communication protocol as controlled by the server control unit 30.

The operation of devices in the POS system 1 when processing a transaction at the checkout counter L is described next.

Figure 3:
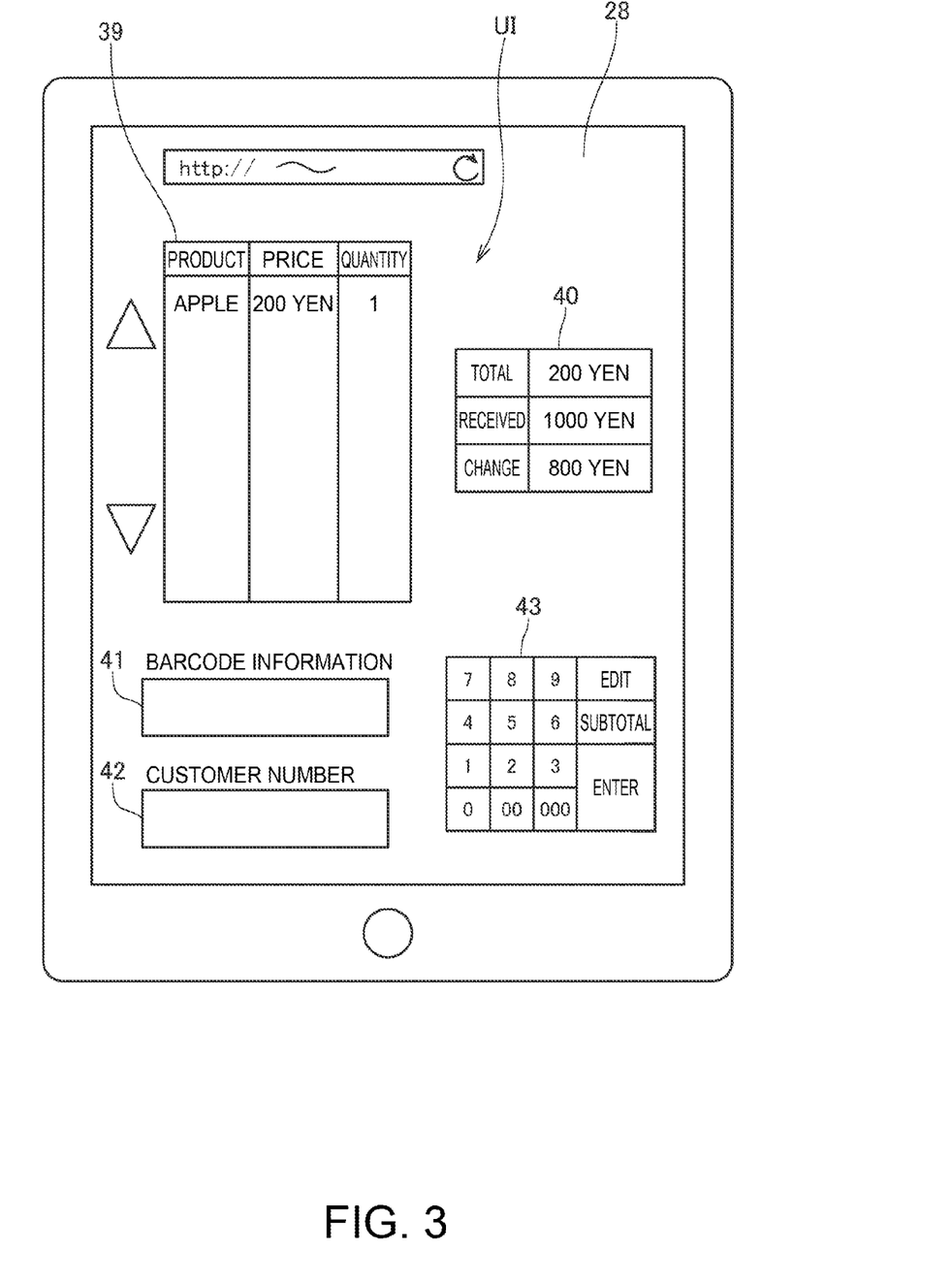
FIG. 3 illustrates an example of a user interface displayed on a touch panel.

The tablet terminal 10 executes the following process before processing a transaction. More specifically, the checkout clerk starts the web browser on the tablet terminal 10, and issues a command to present a dedicated user interface UI on the touch panel 28. In response to this command, the browser execution unit 261 of the terminal control unit 26 accesses a specific address on the POS server 17 to get an HTML or other type of drawing file, and displays the dedicated user interface UI based on the acquired drawing file. The application execution unit 301 of the POS server 17 handles generating and sending the drawing file. A script for executing transaction-related processes in conjunction with the application execution unit 301 of the POS server 17 is embedded in the drawing file in a specific scripting language.

FIG. 3 shows an example of the dedicated user interface UI displayed on the touch panel 28.

A list display area 39 where the names of the products purchased by the customer, the prices of the products, and the quantities of the products are presented in a list is displayed at the top left of the dedicated user interface UI in FIG. 3. To the right of this list display area 39 is presented an amount display area 40 where the total amount of the products purchased by the customer, the amount of money received from the customer in the transaction, and the amount of change due to the customer are displayed.

Below the list display area 39 is a barcode information input field 41, which is an input field where the information (referred to below as barcode information) expressed by the barcode that is read by the barcode scanner 12 is input and displayed. The barcode information is basically a product code assigned to each product.

Below the barcode information input field 41 is a customer number input field 42, which is an input field where the customer number acquired by reading a customer loyalty card, for example, with the card reader 13 is input and displayed when a card is read.

A virtual keypad 43 is displayed on the right side of the barcode information input field 41 and the customer number input field 42.

Figure 4:
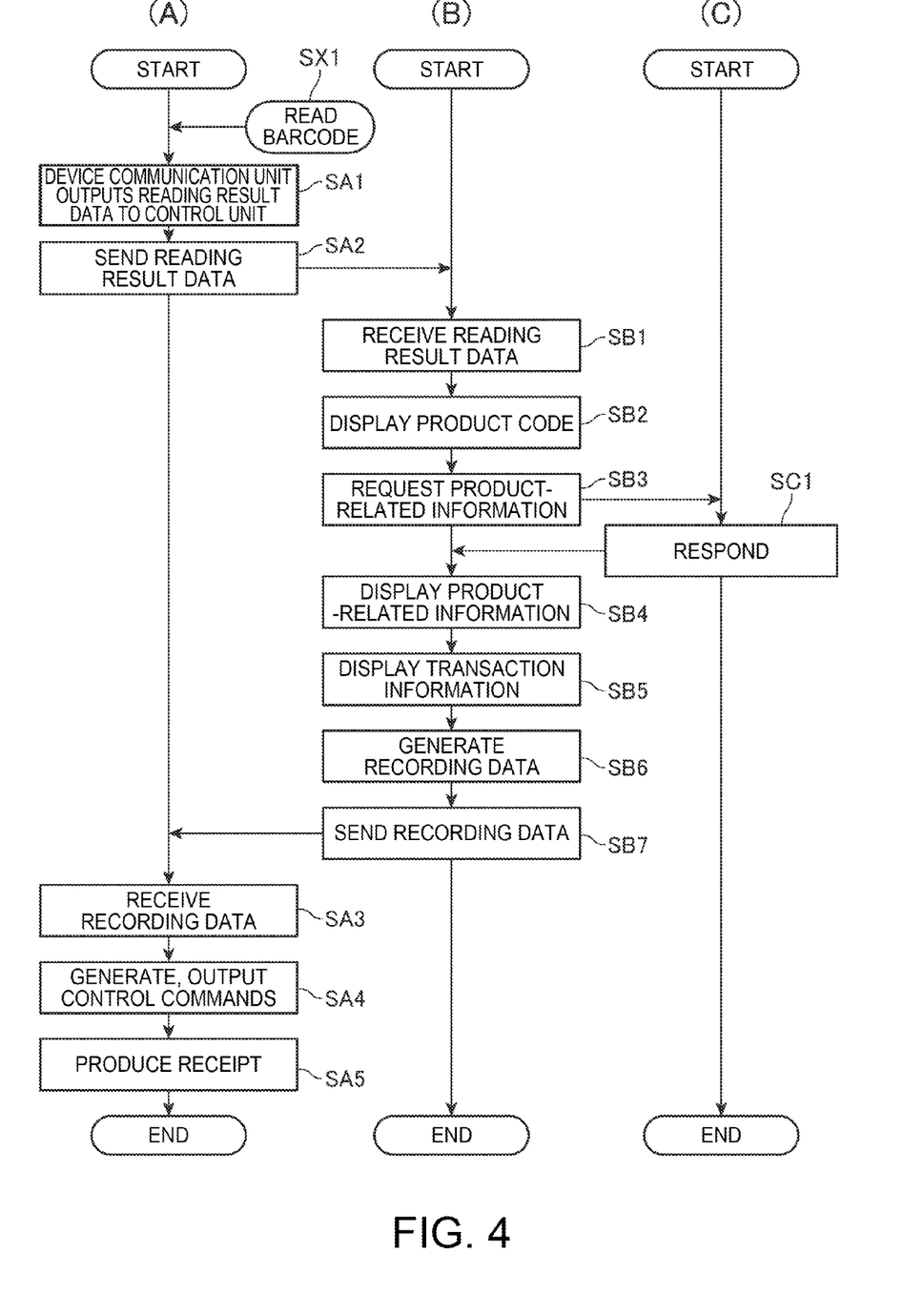
FIG. 4 is a flow chart of the operation of devices in the POS system.

FIG. 4 is a flow chart of the operation of devices in the POS system 1. FIG. 4 describes the operation of devices in the POS system 1 when a customer purchases one product. In FIG. 4, column (A) shows the operation of the recording device 11, column (B) shows the operation of the tablet terminal 10, and column (C) shows the operation of the POS server 17.

As shown in FIG. 4, column (A), at the checkout counter L, the checkout clerk first uses the barcode scanner 12 to scan the barcode on the one product purchased by the customer (step SX1). The barcode scanner 12 then outputs data based on the result of reading the barcode (referred to below as "reading result data") to the device communication unit 24 through the port to which the barcode scanner 12 connects.

As shown in FIG. 4, column (A), the device communication unit 24 of the recording device 11 outputs the input reading result data to the control unit 20 (step SA1). The control unit 20 then controls the communication unit 23 to send the input reading result data to the tablet terminal 10 (step SA2).

As shown in FIG. 4, column (B), the browser execution unit 261 of the terminal control unit 26 of the tablet terminal 10 controls the terminal communication unit 27 to receive the reading result data (step SB1). Next, the browser execution unit 261 displays information expressed by the reading result data (a product code in this example) in the barcode information input field 41 of the dedicated user interface UI (step SB2). Next, the browser execution unit 261 communicates with the application execution unit 301 of the server control unit 30 of the POS server 17 to get the name and price of the product specified by the product code (step SB3).

As shown in FIG. 4, column (C), the application execution unit 301 of the server control unit 30 of the POS server 17 acquires the appropriate information from the appropriate databases in response to the query, and returns the product name and product price (step SC1).

As shown in FIG. 4, column (B), the browser execution unit 261 then acquires and displays the returned product name and product price, and displays the product name, product price, and product quantity information in the list display area 39. The browser execution unit 261 also displays the total of the products purchased by the customer in the amount display area 40 (step SB4).

Next, when the checkout clerk finalizes the transaction through the virtual keypad 43, the checkout clerk receives payment from the customer and returns any change due. The browser execution unit 261 communicates appropriately with the application execution unit 301 and displays the appropriate information in the appropriate fields of the amount display area 40 (step SB5).

Next, the browser execution unit 261 generates recording data containing information related to the receipt for the printing unit 21 to produce (step SB6). In this embodiment of the invention, the recording data is an XML document, and included in the recording data (XML document) is the information required to produce a receipt, such as information about the text and images to be printed on the receipt, in an XML-compliant format.

Next, the browser execution unit 261 controls the terminal communication unit 27 to send the generated recording data to the recording device 11 (step SB7).

As shown in FIG. 4, column (A), the control unit 20 of the recording device 11 controls the communication unit 23 to receive the recording data in response to transmission of the recording data by the browser execution unit 261 (step SA3).

Next, based on the received recording data, the control unit 20 generates control commands in the command language of the printing unit 21. The control commands generated here are control commands in causing the printing unit 21 to execute the processes related to producing a receipt, and the control unit 20 outputs the control commands to the printing unit 21 (step SA4). The control circuit of the printing unit 21 then controls the mechanisms based on the control commands to produce a receipt (step SA5).

The processes related to communication, processes related to recording, processes related to device control, and other processes of recording device 11 are executed by functions of a backbone system KS (see FIG. 5) embedded in the recording device 11.

Figure 5:
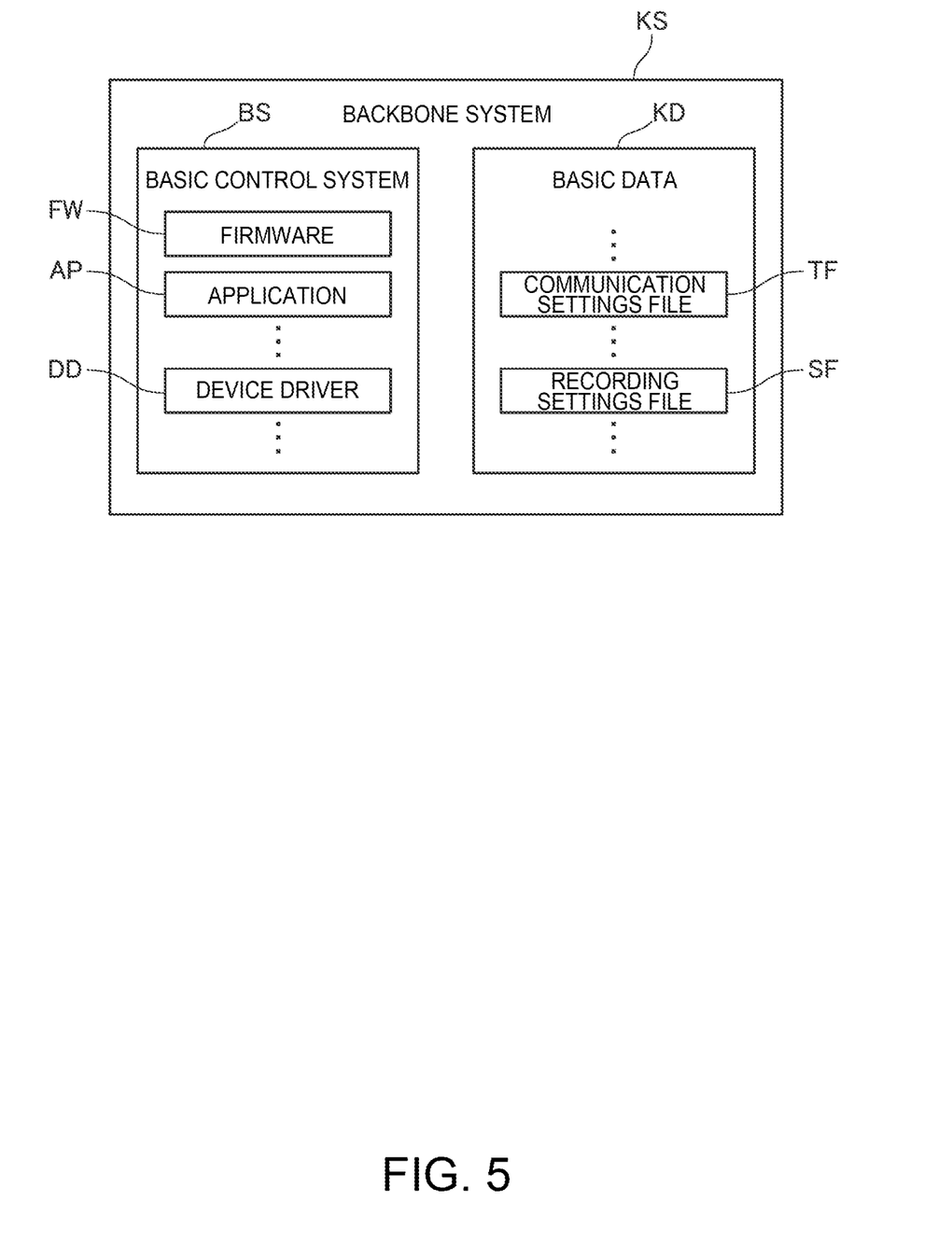
FIG. 5 is a block diagram of a backbone system.

FIG. 5 illustrates the backbone system KS. As shown in FIG. 5, the backbone system KS includes a basic control system BS. The basic control system BS is a system including programs related to controlling communication by the recording device 11, processes related to recording, processes related to device control, and other processes. The basic control system BS includes firmware FW (control program) for controlling parts of the recording device 11, including the printing unit 21. The basic control system BS includes an application AP providing additional functionality to the recording device 11. The basic control system BS includes one or more device drivers DD related to controlling devices connected to the recording device 11. The basic control system BS is simplified in this example, and the basic control system BS may also include plug-ins used by the firmware FW or databases. The basic control system BS also has versions. The content of basic control systems BS of the same version is identical. More specifically, the programs in basic control systems BS of the same version are identical, and the versions of the programs (firmware FW, application AP, device driver DD) are also the same. The content of different versions of the basic control system BS likewise differ. The basic control system BS also runs under a specific operating system (OS) installed on the recording device 11.

As shown in FIG. 5, the backbone system KS includes basic data KD. The basic data KD is a group of data comprising data used by the programs of the basic control system BS.

The basic data KD includes a communication settings file TF. The communication settings file TF is a file storing communication related settings. The communication related settings include, for example, an IP address, subnet mask, default gateway, settings related to the DNS (domain name system) server, wireless communication settings (such as the network mode (infrastructure mode, ad hoc mode), SSID, authentication method, and encryption method, for example).

The basic data KD also includes a recording settings file SF. The recording settings file SF is a file storing settings related to the recording operation. These recording-related settings include, for example, the recording speed, recording density, margin settings, settings related to images recorded by default, and settings related to the operating mode for recording.

As described above, USB memory UM can connect to the recording device 11. Under specific circumstances, the recording device 11 may restore the backbone system KS based on a restore file stored to USB memory UM in a restore process.

Under specific circumstances, the recording device 11 may also initialize the backbone system KS based on the initialization settings file stored to USB memory UM in an initialization process.

Under specific circumstances, the recording device 11 may also create and save a restore file for restoring the backbone system KS in USB memory UM in a create-and-save process.

Unless specifically differentiated below, the restore process, initialization process, and create-and-save process are referred to as the appropriate process. The recording device 11 executes the appropriate process at the appropriate time using the appropriate method using characteristics of the USB memory UM. Below, the processes of the recording device 11 are described below while also describing the specific content of the appropriate processes and describing the specific content of the data (files) used in the appropriate processes.

Figure 6:
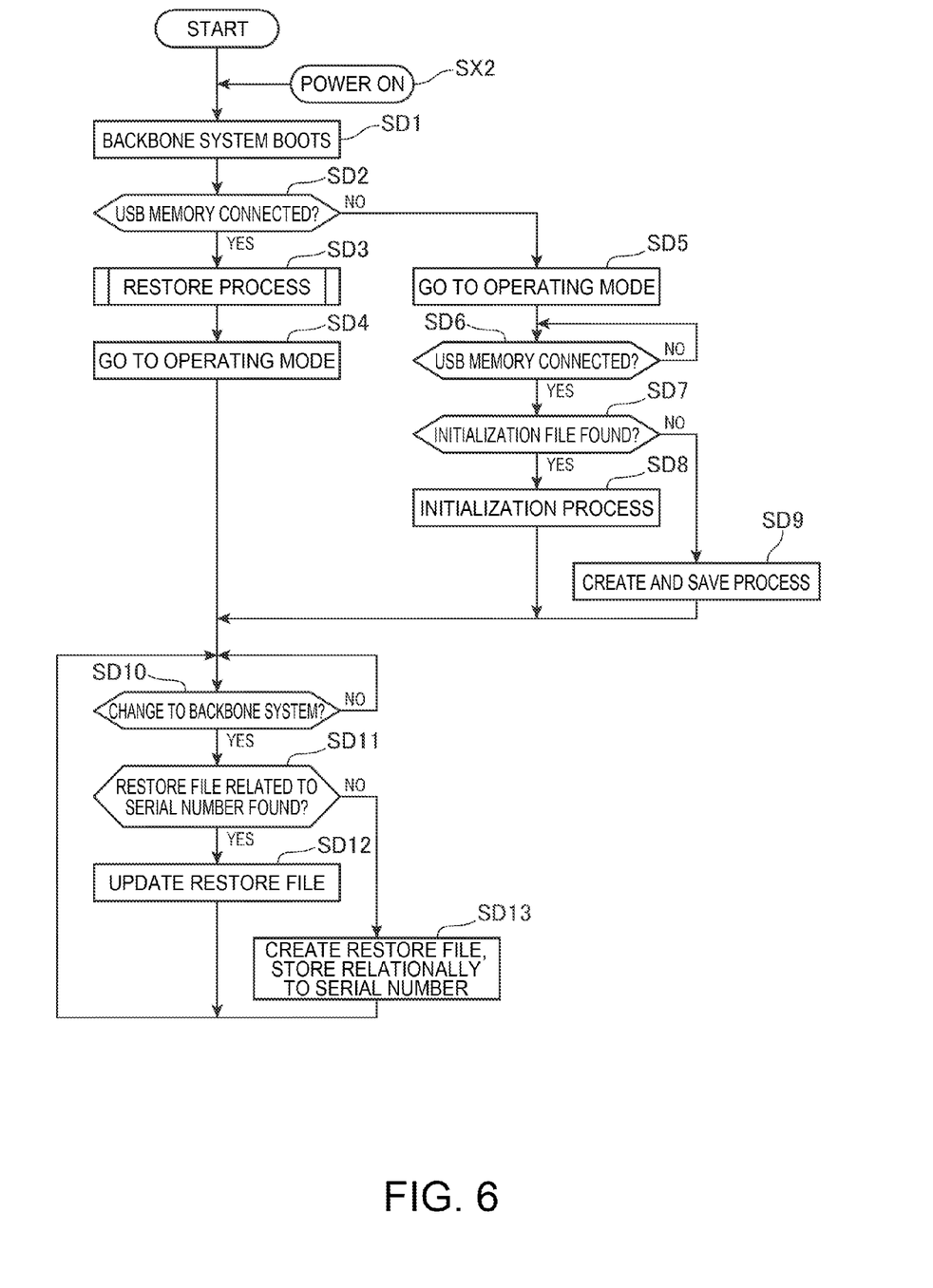
FIG. 6 is a flow chart of the operation of the recording device.

FIG. 6 is a flow chart describing the operation of the recording device 11 after the power turns on. As shown in FIG. 6, when the power turns on (step SX2) and the recording device 11 starts, a specific OS starts and the backbone system KS starts (step SD1). After the backbone system KS starts, the control unit 20 determines if USB memory UM is connected, that is, if the power was turned on with the USB memory UM already connected (step SD2).

If the USB memory UM was connected when the power turned on (step SD2 returns YES), the control unit 20 executes the restore process (step SD3). The restore process is described further below, but is a process that restores the backbone system KS based on the restore file stored in USB memory UM.

The restore process thus executes automatically in this embodiment of the invention if an operation using the ability of the USB memory UM to be installed and removed is performed, in this instance, turning the recording device 11 on with the USB memory UM already connected. As a result, there is no need for the user to perform a complicated task, such as inputting the information required to execute the restore process or inputting a command to start the restore process, through the user interface displayed by a specific method, and user convenience is therefore excellent. Furthermore, because the restore process does not execute if the recording device 11 is not turned on with the USB memory UM connected, the restore process can be prevented from running when not intended.

After the restore process, the restored backbone system KS boots and the recording device 11 enters the operating mode (step SD4). Being in the operating mode means the recording device 11 can execute processes, including the recording process and communication process, by functions of the backbone system KS. Next, the control unit 20 goes to step SD10. Operation from step SD10 is described further below.

If the USB memory UM is not connected when the power turns on (step SD2 returns NO), the recording device 11 enters the operating mode (step SD5). While the recording device 11 is in the operating mode, the control unit 20 monitors to detect when USB memory UM is connected (step SD6).

If USB memory UM is connected (step SD6 returns YES), the control unit 20 determines whether or not the initialization file is stored in USB memory UM (step SD7).

The initialization file is a file used for initializing data that can be initialized in the basic data KD. For example, in the case of the communication settings file TF, data initialization means setting the settings of communication related settings to default settings. In the case of the recording settings file SF, data initialization means setting the settings of recording operation settings to default settings.

If an initialization file is stored in the USB memory UM (step SD7 returns YES), the control unit 20 executes the initialization process (step SD8). The initialization process is a process that initializes data in the basic data KD based on the initialization file. After the initialization process, the control unit 20 goes to step SD10. Operation from step SD10 is described further below.

In this embodiment of the invention, therefore, the initialization process executes automatically if an operation using the ability of the USB memory UM to be installed (e.g. connected) and removed (e.g. disconnected) is performed. In this instance, the operation is connecting USB memory UM, that has an initialization file stored within it, to the recording device 11 while the recording device 11 is running. As a result, there is no need for the user to perform a complicated task, such as inputting the information required to execute the initialization process or inputting a command to start the initialization process, through the user interface displayed by a specific method, and user convenience is therefore excellent. Furthermore, because the initialization process does not execute if a USB memory UM storing the initialization file is not connected while the recording device 11 is running, the initialization process can be prevented from running when not intended.

If an initialization file is not stored in the USB memory UM in step SD7 (step SD7 returns NO), the control unit 20 executes the create-and-save process (step SD9). In the create-and-save process, the control unit 20 creates a restore file for the backbone system KS (backbone system restore file). The backbone system restore file is a so-called backup file, and it includes multiple restore routines (or sub-files) used in the restore process described further below. The backbone system restore file restores the backbone system KS to the same state as when the backbone system restore file was created.

The backbone system restore file includes a restore sub-file for restoring the basic control system BS (termed a "system restore file"), and a restore sub-file for restoring the basic data KD (termed a "data restore file").

After generating the backbone system restore file, the control unit 20 gets the serial number of the recording device 11. The serial number is identification information uniquely assigned to a particular recording device 11 when the recording device 11 is manufactured. Information representing the serial number is stored in a specific storage area. Next, the control unit 20 stores the generated backbone system restore file relationally to the acquired serial number in USB memory UM. This relationship is created by, for example, including the serial number in the file name of the backbone system restore file based on a specific rule. Alternatively, this relationship may be made by previously storing a data table relating the file name of the backbone system restore file and the serial number in the USB memory UM, and adding to the table a record linking the file name of the generated backbone system restore file to the acquired serial number.

After executing the create-and-save process, the control unit 20 goes to step SD10. Operation from step SD10 is described further below.

In this embodiment of the invention, therefore, the create-and-save process executes automatically if an operation using the ability of the USB memory UM to be installed and removed is performed; in this instance, connecting a USB memory UM that does not already have an initialization file stored within it to the recording device 11 while the recording device 11 is running (e.g. already turned on). As a result, there is no need for the user to perform a complicated task, such as inputting the information required to execute the create-and-save process or inputting a command to start the create-and-save process, through the user interface displayed by a specific method, and user convenience is therefore excellent. Furthermore, because the create-and-save process does not execute if a USB memory UM not storing the initialization file is not connected while the recording device 11 is running, the create-and-save process can be prevented from running when not intended.

As shown in step SD10, while the recording device 11 is running, the control unit 20 monitors whether or not there is a change in the backbone system KS (step SD10). A change in the backbone system KS includes, for example, changing the version of the basic control system BS or changing the content of content stored in the basic data KD.

If there is a change in the backbone system KS, the control unit 20 determines if a backbone system restore file related to the serial number of the recording device 11 is stored in the USB memory UM (step SD11). If a backbone system restore file related to the serial number of the recording device 11 is stored (step SD11 returns YES), the control unit 20 updates the backbone system restore file related to the serial number based on the changes in the backbone system KS (step SD12). Next, the control unit 20 returns to step SD10. As a result, the backbone system restore file stored in the USB memory UM is updated to a file matching the updated backbone system KS.

If a backbone system restore file related to the serial number of the recording device 11 is not stored in the USB memory UM (step SD11 returns NO), the control unit 20 creates a backbone system restore file based on the changes in the backbone system KS and stores the file relationally to the serial number in the USB memory UM (step SD13). The control unit 20 then returns to step SD10. As a result, a backbone system restore file reflecting the changes in the backbone system KS is relationally stored to the serial number in the USB memory UM.

The restore process executes in step SD3 is described next.

Figure 7:
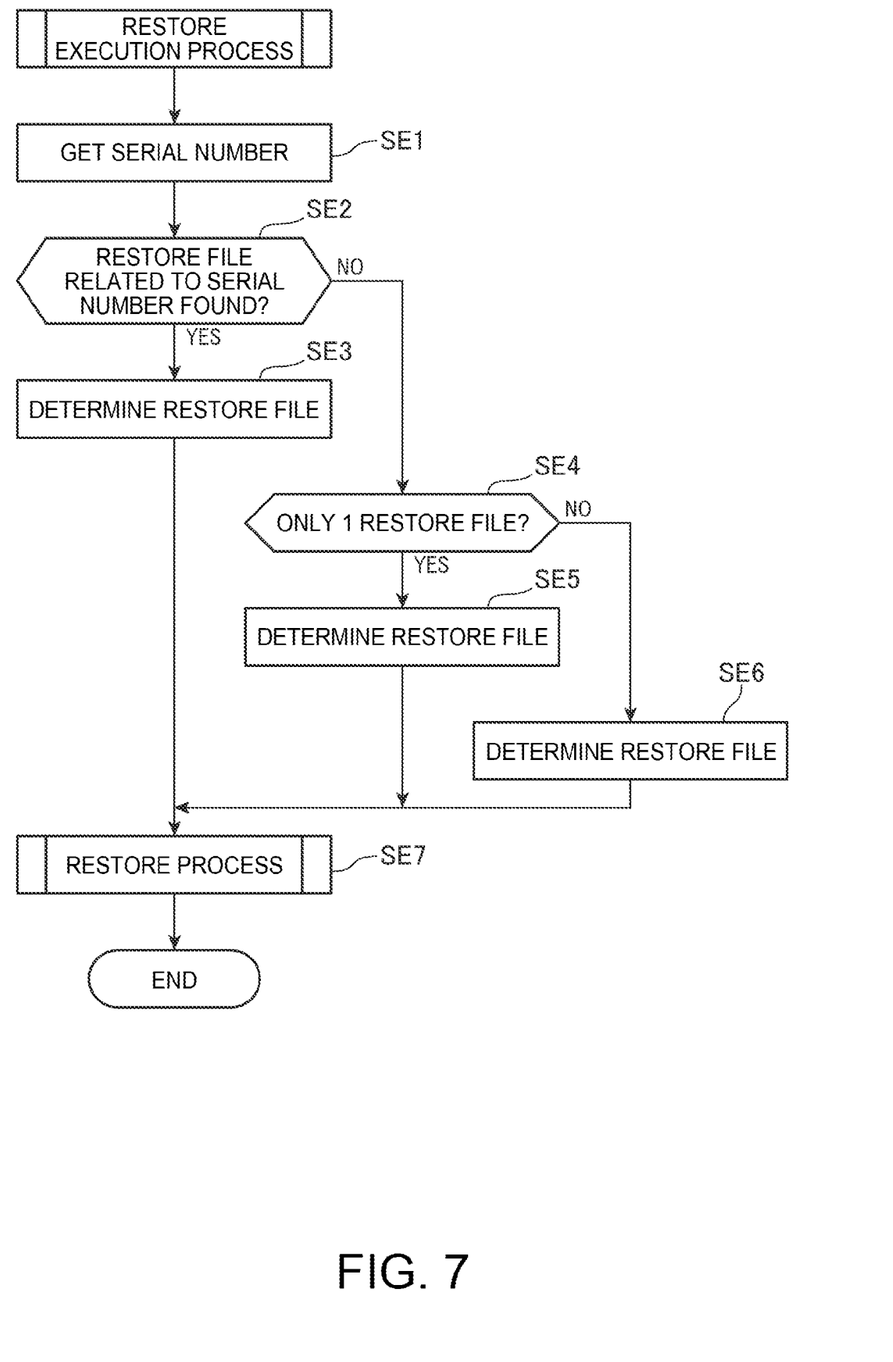
FIG. 7 is a flow chart of the operation of the recording device.

FIG. 7 is a flow chart describing the restore process in detail. As shown in FIG. 7, the control unit 20 first gets the serial number of the recording device 11 (step SE1). Next, the control unit 20 controls the device communication unit 24 to access the USB memory UM and determine whether or not there is a backbone system restore file relationally stored to the serial number acquired in step SE1 (step SE2).

If there is a backbone system restore file relationally stored to the serial number (step SE2 returns YES), the control unit 20 identifies the backbone system restore file relationally stored to the serial number as the file to use for restoring the backbone system KS (step SE3). Next, the control unit 20 goes to step SE7 and runs the execute restore process. While described in detail below, the execute restore process is a process that restores the backbone system KS based on the specified backbone system restore file.

In this embodiment of the invention, one recording device 11 having one serial number restores the backbone system KS using the backbone system restore file when a backbone system restore file related to that serial number is stored in the USB memory UM. As a result, the user can simply do the following to make one recording device 11 run the execute restore process based on a backbone system restore file for that recording device 11.

Specifically, the user stores a backbone system restore file relationally to the one serial number of the one recording device 11 in USB memory UM, and then simply starts the recording device 11 (turns the power on) after connecting the USB memory UM to the recording device 11.

The user can also run the execute restore process on plural recording devices 11 using a backbone system restore file specific to each recording device 11 by doing the following.

Specifically, the user stores a backbone system restore file for each recording device 11 relationally to the serial number of each recording device 11 in USB memory UM. The user then simply starts each recording device 11 (turns the power on) after first connecting the USB memory UM to each recording device 11. The user can thus easily make each of plural recording devices 11 run the execute restore process using a backbone system restore file specific to each recording device 11.

If in step SE2 a backbone system restore file related to the serial number acquired in step SE1 is not stored in the USB memory UM (step SE2 returns NO), the control unit 20 makes the following decision (step SE4). Specifically, the control unit 20 determines if there is only one backbone system restore file stored in USB memory UM (step SE4). If there is only one backbone system restore file stored in USB memory UM (step SE4 returns YES), the control unit 20 identifies that one backbone system restore file as the file to use for restoring the backbone system KS (step SE5) irrespective of whether the one backbone system restored file is not relationally linked to the acquired serial number. Next, the control unit 20 goes to step SE7 and runs the execute restore process.

As a result, if there is only one backbone system restore file stored in USB memory UM, the control unit 20 in this embodiment of the invention restores the backbone system KS using that one backbone system restore file. The effect of this is described below.

Specifically, if the business in which the POS system 1 is used is small and there is only one recording device 11 in the store, the user can prepare a USB memory UM for restoring the backbone system KS on the one recording device 11 as follows. The user first prepares a USB memory UM in which a single backbone system restore file corresponding to a single recording device 11 is stored without being related to the serial number of the one recording device 11. As a result, the user does not need to relate the serial number of the one recording device 11 to the corresponding backbone system restore file (by changing the file name or modifying a data table for managing the relationship), and user convenience is improved.

If there are plural backbone system restore files stored in the USB memory UM in step SE4 (step SE4 returns NO), the control unit 20 identifies the backbone system restore file selected by the user from among the plural backbone system restore files that are stored as the file to use for restoring the backbone system KS (step SE6).

More specifically, the control unit 20 sends control data including the file names of the plural backbone system restore files to the tablet terminal 10 to display a user interface enabling the user to select (specify) one of the plural backbone system restore files through the tablet terminal 10. The browser execution unit 261 of the terminal control unit 26 of the tablet terminal 10 then receives the control data. Based on the received control data, the browser execution unit 261 displays the file names of the plural backbone system restore files on the touch panel 28 in a user interface prompting the user to select one of the file names. Using the user interface, the user then selects the file name of one of the backbone system restore files. The browser execution unit 261 then sends data including the selected file name to the recording device 11. The control unit 20 of the recording device 11 then receives the data. The control unit 20 then identifies the backbone system restore file of the file name contained in the received data as the file to use for restoring the backbone system KS (step SE6). Next, the control unit 20 goes to step SE7 and runs the execute restore process.

In this embodiment of the invention, when a backbone system restore file related to the corresponding serial number is not stored in the USB memory UM, or there is not only one backbone system restore file stored, the control unit 20 runs the execute restore process based on the backbone system restore file selected by the user. As a result, the execute restore process running based on a backbone system restore file not intended by the user can be prevented specific cases.

Figure 8:
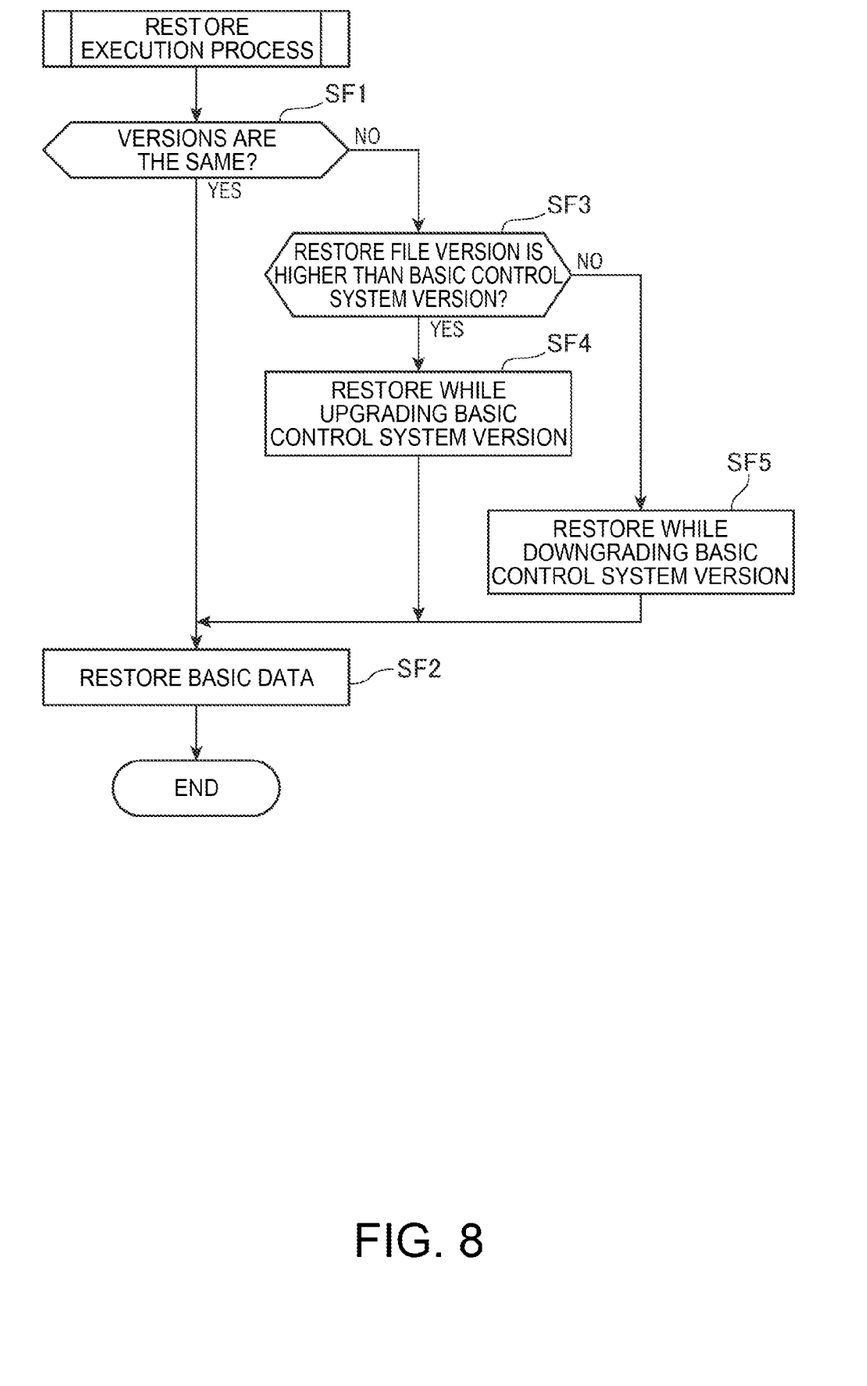
FIG. 8 is a flow chart of the operation of the recording device.

The execute restore process in step SD7 is described next. FIG. 8 is a flow chart describing the execute restore process in detail. In the following description referencing FIG. 8, the backbone system restore file specified by the control unit 20 in step SE3, step SE5, or step SE6 in FIG. 7 is referred to as the selected backbone system restore file.

As shown in FIG. 8, the control unit 20 determines whether or not the version of the basic control system BS of the backbone system KS installed on the recording device 11, and the version of the basic control system BS of the system restore file (the restore file for restoring the basic control system BS) in the selected backbone system restore file are the same (step SF1). If the versions match (step SF1 returns YES), the control unit 20 restores the basic data KD based on the data restore file (restore file for restoring the basic data KD) in the selected backbone system restore file.

If the versions match, the control unit 20 thus restores the basic data KD without restoring the basic control system BS. This has the following effect. As described above, the content of the basic control system BS is the same for all basic control systems BS of the same version. Therefore, if the version of the basic control system BS installed on the recording device 11 and the version of the basic control system BS in the system restore file of the selected backbone system restore file match, the content of the systems is the same. By not restoring the basic control system BS in this case, the time consumed by the execute restore process can be shortened.

However, if the versions do not match (step SF1 returns NO), the control unit 20 determines if the version of the basic control system BS in the system restore file of the selected backbone system restore file is higher than the version of the basic control system BS installed on the recording device 11 (step SF3). If the version is higher (step SF3 returns YES), the control unit 20 restores while upgrading the version of basic control system BS of the recording device 11 based on the system restore file of the selected backbone system restore file (step SF4). Next, the control unit 20 goes to step SF2, and restores the basic data KD based on the data restore file. This completes restoring the backbone system KS based on the selected backbone system restore file.

If the version is lower (step SF3 returns NO), the control unit 20 restores the basic control system BS of the recording device 11 while downgrading the system version based on the system restore file of the selected backbone system restore file (step SF5). Next, the control unit 20 goes to step SF2, and restores the basic data KD based on the data restore file. This completes restoring the backbone system KS based on the selected backbone system restore file.

As described above, a recording device 11 according to this embodiment has a printing unit 21 (recording unit) that records on roll paper (recording medium); and a control unit 20 that executes a restore process to restore a backbone system KS, which includes a basic control system BS including at least firmware FW (control program) for controlling a printing unit 21 and basic data KD used by the basic control system BS, if USB memory UM (external storage medium) storing a restore file is connected to the recording device 11 when the recording device 11 is turned on.

If the USB memory UM is connected while the recording device 11 is running, the control unit 20 determines if an initialization file is stored on the USB memory UM, and then operates as described below. If the initialization file is stored on the USB memory UM, the control unit 20 initializes the basic system based on the initialization file. If the initialization file is not stored on the USB memory UM, the control unit 20 creates a restore file for restoring the backbone system KS and stores the restore file to USB memory UM. Using the ability of the USB memory UM to be installed and removed, the user can use the USB memory UM to cause the recording device 11 to execute specific processes, including restoring data based on a restore file, initialization based on the initialization file, and creating and saving a restore file.

If the recording device 11 is running with USB memory UM connected thereto and a change is made to the backbone system KS, the control unit 20 in this embodiment of the invention determines whether or not a restore file is stored on the USB memory UM to determine what to do. If a restore file is stored on the USB memory UM, the recording device 11 updates the restore file based on the modified backbone system KS. If a restore file is not stored on the USB memory UM, the control unit 20 creates a new restore file based on the modified backbone system KS and stores the restore file to USB memory UM. The restore file stored on the USB memory UM can therefore be kept current with changes in the backbone system KS.

When the control unit 20 runs the restore process, the control unit 20 in this embodiment of the invention restores the installed basic data KD based on the restore file, and restores the installed basic control system BS based on the restore file if the version of the installed basic control system BS differs from the basic control system BS in the restore file. Thus comprised, restoring the basic control system BS when not necessary can be prevented, and the time required for the restore process can be shortened.

A recording device 11 according to another aspect of the invention has a printing unit 21 (recording unit) that records on recording media; and a control unit 20 that runs a restore process to restore a backbone system KS including a basic control system BS having at least firmware FW (control program) and basic data KD that is used by the basic control system BS, based on a restore file stored in a connected USB memory UM (external storage medium).

If there is only one restore file stored in USB memory UM when the restore process executes, the control unit 20 restores the backbone system KS based on the single stored restore file. If there are plural restore files on the USB memory UM each related to a serial number, the control unit 20 restores the backbone system KS based on the restore file stored relationally to the serial number of the control unit 20 device. This aspect of the invention enables restoring the backbone system KS using a restore file appropriate to the recording device 11 when restoring the backbone system KS of a recording device 11 based on a restore file stored to USB memory UM.

The control unit 20 in this embodiment of the invention runs the restore process when the device starts with the USB memory UM connected. This enables the user to cause the recording device 11 run the restore process by simply connecting the USB memory UM and then starting the recording device 11.

When plural restore files are stored in the USB memory UM relationally to a serial number, the control unit 20 in this embodiment of the invention restores the backbone system KS based on the specified restore file. Thus comprised, the user can restore the system using the selected restore file under specific circumstances.

If USB memory UM is connected while the recording device 11 is operating and an initialization file is stored to the USB memory UM, the control unit 20 in this embodiment of the invention initializes the backbone system KS based on the initialization file. However, if the initialization file is not stored to USB memory UM, the control unit 20 creates a restore file for restoring the backbone system KS, and stores the restore file relationally to the device serial number in USB memory UM. Thus comprised, the user can create and save a restore file by connecting USB memory UM in which an initialization file is not stored to the recording device 11 while the recording device 11 is running.

When the recording device 11 is operating with USB memory UM connected and a change is made to the backbone system KS, the control unit 20 in this embodiment of the invention determines if a restore file related to the serial number of the recording device 11 is stored in USB memory UM. If a restore file related to the serial number of the recording device 11 is stored in USB memory UM, the control unit 20 updates the restore file related to the serial number to reflect the changes made to the backbone system KS. If a restore file related to the serial number of the recording device 11 is not stored in USB memory UM, the control unit 20 creates a restore file based on the modified backbone system KS and stores the restore file related to the device serial number to USB memory UM. As a result, a restore file based on the modified backbone system KS is relationally stored to the serial number in USB memory UM.

The invention is described above with reference to a preferred embodiment thereof, but the invention is not limited thereto and can be modified and adapted in many ways without departing from the scope of the accompanying claims.

The external storage medium in the embodiment described above is USB memory UM. However, the storage medium may be any device that is removably installable to the recording device 11 and can store data.

The recording device 11 in the foregoing embodiment uses a thermal printing method, but the printing method is not limited to thermal printing.

The function units described above can also be achieved as desired using hardware and software, and do not suggest a specific hardware configuration.

The invention being thus described, it will be obvious that it may be varied in many ways. Such variations are not to be regarded as a departure from the spirit and scope of the invention, and all such modifications as would be obvious to one skilled in the art are intended to be included within the scope of the following claims.

What is claimed is:

1. A printer comprising:
   a recorder that records on recording media; and
   a controller configured to:
   in response to an external storage medium being already connected to the printer when the printer turns on, execute a restore process to restore a backbone system having a basic control system including a control program controlling the recorder and having basic data used by the basic control system, based on a restore file if the restore file is stored in the external storage medium,
   in response to the external storage medium becoming connected to the printer while the printer is running, initialize the backbone system based on an initialization file if the initialization file is already stored in the external storage medium, and create a new restore file to restore the backbone system and save, relationally to a serial number of the printer, the created new restore file to the external storage medium if the restore file is not stored in the external storage medium.

2. The printer described in claim 1, wherein:
   in response to the backbone system being modified while the external storage medium is connected to the printer and the printer is operating, the controller stores an updated restore file based on the modified backbone system in the external storage medium.

3. The printer described in claim 2, wherein:
   in response to an existing restore file being already stored in the connected external storage medium when the backbone system is modified and the printer is operating, the controller updates the existing restore file in the external storage medium based on the modified backbone system; and in response to a restore file not being already stored in the connected external storage medium when the backbone system is modified and the printer operating, the controller creates the updated restore file based on the modified backbone system and saves the updated restore file to the external storage medium.

4. The printer described in claim 3, wherein:

when executing the restore process, the controller restores the installed basic data based on the restore file, and restores the installed basic control system based on the restore file if the version of the installed basic control system differs from the version of the basic control system in the restore file.

5. A control method of a printer that records on recording media, the control method comprising:

in response to an external storage medium being already connected to the printer when the printer turns on, executing a restore process to restore a backbone system having a basic control system including a control program controlling the recorder and having basic data used by the control system, based on a restore file if the restore file is stored in the external storage medium;

in response to the external storage medium becoming connected to the printer while the printer is running, initializing the backbone system based on an initialization file if the initialization file is already stored in the external storage medium, and creating a new restore file to restore the backbone system and saving, relationally to a serial number of the printer, the created new restore file to the external storage medium connected to the printer if the restore file is not stored in the external storage medium.

6. The control method of a printer described in claim 5, further comprising:

in response to the backbone system being modified while the external storage medium is connected to the printer while the printer is operating, storing an updated restore file based on the modified backbone system in the external storage medium.

7. The control method of a printer described in claim 6, further comprising:

in response to an existing restore file being stored in the connected external storage medium when the backbone system is modified and the printer is operating, automatically updating the existing restore file in the external storage medium based on the modified backbone system; and in response to a restore file not being already stored in the connected external storage medium when the backbone system is modified and the printer is operating, automatically creating the updated restore file based on the modified backbone system and saving the updated restore file to the external storage medium.

8. The control method of a printer described in claim 7, further comprising:

restoring the installed basic data based on the restore file, and restoring the installed basic control system based on the restore file if the version of the installed basic control system differs from the version of the basic control system in the restore file when executing the restore process.

\* \* \* \* \*